uscoo6954563B2

(12) United States Patent
Kaplan (10) Patent No.: US 6,954,563 B2
(45) Date of Patent: Oct. 11, 2005

(54) OPTICAL ROUTING MECHANISM WITH INTEGRAL FIBER INPUT/OUTPUT ARRANGEMENT ON MEMS DIE

(75) Inventor: Michael L. Kaplan, Boulder, CO (US)

(73) Assignee: PTS Corporation, San Jose, CA (US)

( * ) Notice: Subject to any disclaimer, the term of this patent is extended or adjusted under 35 U.S.C. 154(b) by 99 days.

(21) Appl. No.: 10/401,416

(22) Filed: Mar. 28, 2003

(65) Prior Publication Data

US 2004/0190819 A1 Sep. 30, 2004

(51) Int. Cl.[7] .............................. G02B 6/26; G02B 6/28
(52) U.S. Cl. ............................. 385/24; 385/15; 385/17; 385/18; 385/31
(58) Field of Search ............................. 385/18, 19, 24, 385/31, 39, 15, 17

(56) References Cited

U.S. PATENT DOCUMENTS

| | | | |
|---|---|---|---|
| 5,414,540 A | 5/1995 | Patel et al. | |
| 5,917,625 A | 6/1999 | Ogusu et al. | |
| 5,960,133 A | * 9/1999 | Tomlinson | .................... 385/18 |
| 5,999,672 A | 12/1999 | Hunter et al. | |
| 6,097,519 A | 8/2000 | Ford et al. | |
| 6,097,859 A | 8/2000 | Solgaard et al. | |
| 6,108,471 A | 8/2000 | Zhang et al. | |
| 6,236,778 B1 | 5/2001 | Laughlin | |
| 6,268,952 B1 * | 7/2001 | Godil et al. | ................. 359/291 |
| 6,307,657 B1 | 10/2001 | Ford | |
| 6,389,188 B1 * | 5/2002 | Scobey et al. | ................. 385/18 |
| 6,438,295 B1 * | 8/2002 | McGarry et al. | ............. 385/39 |
| 6,439,728 B1 | 8/2002 | Copeland | |
| 6,501,877 B1 | 12/2002 | Weverka et al. | |
| 6,798,941 B2 * | 9/2004 | Smith et al. | ................... 385/18 |
| 2003/0053749 A1 | 3/2003 | Roth et al. | |

FOREIGN PATENT DOCUMENTS

WO     WO 1/79901 A     10/2003

OTHER PUBLICATIONS

Ford, Joseph E., et al., "Wavelength Add–Drop Switching Using Tilting Micromirrors," Journal of Lightwave Technology, vol. 17, No. 5, May 1999.
Grade, John D., et al., "A Large–Deflection Electrostatic Actuator for Optical Switching Applications," Solid–State Sensor and Actuator Workshop, Hilton Head Island, SC, pp. 97–100, Jun. 4–8, 2000.
Nishi, I., et al., "Broad–Passband–Width Optical Filter for Multi/Demultiplexer Using a Diffraction Grating and a Retroreflector Prism," Electronics Letters, vol. 21, No. 10, May 9, 1985.
Philippe, P, et al., "Wavelength demultiplexer: using echelette gratings on silicon substrate," Applied Optics, vol. 24, No. 7, pp. 1006–1011, Apr. 1, 1985.
Rallison, R.D., "Dense Wavelength Division Multiplexing (DWDM) and the Dickson Grating," White Paper, Jan. 6, 2001.
Sun, Z. J., et al., "Demultiplexer with 120 Channels and 0.29–nm Channel Spacing," IEEE Photonics Technology Letters, vol. 10, No. 1, pp. 90–92, Jan. 1, 1998.

* cited by examiner

*Primary Examiner*—John R. Lee
*Assistant Examiner*—Paul M. Gurzo
(74) *Attorney, Agent, or Firm*—Townsend and Townsend and Crew LLP (57) ABSTRACT

An optical routing mechanism is provided that may be used in a wavelength router configured to receive light having multiple spectral bands from an input fiber and to direct subsets of the spectral bands to respective output fibers. A free-space optical train provides optical paths for routing the spectral bands between the input fiber and the output fibers. The optical routing mechanism has multiple configurable routing elements to determine how each spectral band is directed. A common surface integrally mates the optical routing mechanism with end portions of the input and output fibers, permitting effective planarization of some optical elements.

12 Claims, 8 Drawing Sheets

OPTICAL ROUTING MECHANISM WITH INTEGRAL FIBER INPUT/OUTPUT ARRANGEMENT ON MEMS DIE

BACKGROUND OF THE INVENTION

This application relates generally to fiber-optic communications and relates more specifically to methods and systems for routing different spectral bands of an optical signal to different output ports.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However SONET/SDH systems are designed to process only a single optical channel. Multi-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

In order to perform wavelength routing functions optically today, the light stream must first be de-multiplexed or filtered into its many individual wavelengths, each on an individual optical fiber. Then each individual wavelength must be directed toward its target fiber using a large array of optical switches commonly called as optical cross-connect (OXC). Finally, all of the wavelengths must be re-multiplexed before continuing on through the destination fiber. This compound process is complex, very expensive, decreases system reliability and complicates system management. The OXC in particular is a technical challenge. A typical 40–80 channel DWDM system will require thousands of switches to fully cross-connect all the wavelengths. Opto-mechanical switches, which offer acceptable optical specifications are too big, expensive and unreliable for widespread deployment. New integrated solid-state technologies based on new materials are being researched, but are still far from commercial application.

Consequently, the industry is aggressively searching for an all-optical wavelength routing solution which enables cost-effective and reliable implementation of high-wavelength-count systems.

BRIEF SUMMARY OF THE INVENTION

Embodiments of the invention thus provide an optical routing mechanism and a wavelength router, as well as a method for using such devices, that permit various simplifications in manufacturing while simultaneously providing certain desirable optical configurations. Wavelength routers according to embodiments of the invention are configured to receive light having a plurality of spectral bands from an input fiber and to direct subsets of the spectral bands to respective ones of a plurality of output fibers. A free-space optical train provides optical paths for routing the spectral bands between the input fiber and the output fibers. An optical routing mechanism having a plurality of dynamically configurable routing elements determines how each spectral band is directed depending on the state of the individual routing elements. According to some embodiments, a common surface is used for integrally mating the optical routing mechanism with end portions of the input and output fibers. Such an arrangement may permit effective planarization of some optical elements, thereby permitting economical manufacture of planar objects to precise tolerance limits, particularly when compared with arrangements that instead use generalized three-dimensional objects. Decreased assembly time, process similarity, and tighter repeatability of the assembly permit both cost savings and improved reliability.

In some specific embodiments, a plurality of fiber folding elements are additionally disposed over the common surface. Each fiber folding element is oriented to direct light between a respective one of the fibers and a path parallel to an optical axis of the free-space optical train. Such embodiments may be suitable where the dynamically configurable routing elements comprise tiltable micromirrors and the optical routing mechanism further has a plurality of fixed mirrors, each disposed to encounter particular spectral bands depending on the states of the routing elements.

In other embodiments, the ends of the input and output fibers are disposed in a common plane orthogonal to an optical axis of the free-space optical train. The common plane may be parallel to the common surface. In one such embodiment, a common fiber folding element is disposed over the common surface and oriented to direct light between each of the fibers and a path parallel to an optical axis of the free-space optical train. Such embodiments may be suitable where the dynamically configurable routing elements comprise tiltable micromirrors formed over the common surface and the optical routing mechanism has a first fixed mirror disposed to encounter each spectral band and a plurality of second fixed mirrors that may be encountered by particular spectral bands depending on the states of the routing elements. Such a system may be configured to minimize the effects of conical diffraction resulting from propagation of light through the free-space optical train. In one such embodiment, the fixed mirrors are disposed to encounter the given spectral band at points substantially lying along a conic-surface envelope. In certain specific embodiments, the conic-surface envelope comprises a parabolic-surface envelope, such as in telecentric applications, and in other specific embodiments, the conic-surface envelope comprises an elliptical-surface envelope, such as in applications using a finite exit pupil.

BRIEF DESCRIPTION OF THE DRAWINGS

A further understanding of the nature and advantages of the present invention may be realized by reference to the FIGS. 1A and 1B are schematic top and side views illustrating an embodiment of a four-pass wavelength router.

DETAILED DESCRIPTION OF THE INVENTION

1. Introduction

The following description sets forth embodiments of an optical routing structure according to the invention and to embodiments of an all-optical wavelength router that comprises the optical routing structure. Exemplary embodiments of wavelength routers are provided in commonly assigned U.S. Pat. No. 6,501,877, which is herein incorporated by reference in its entirety, including the Appendix, for all purposes. The optical routing mechanisms described herein may also be used in any appropriate alternative wavelength router configuration.

While references are made in the following description to "input" and "output" fibers, such language is not intended to limit the direction in which light may be propagated. More generally, the functions of the input and output fibers may be reversed without exceeding the intended scope of the invention. For example, a wavelength router embodiment configured with one "input" fiber and two "output" fibers may be used to receive light at the single input fiber and direct light to the two output fibers. Alternatively, the same wavelength router embodiment may be used to receive light at the two output fibers and direct light to the single input fiber.

Figure 1A:
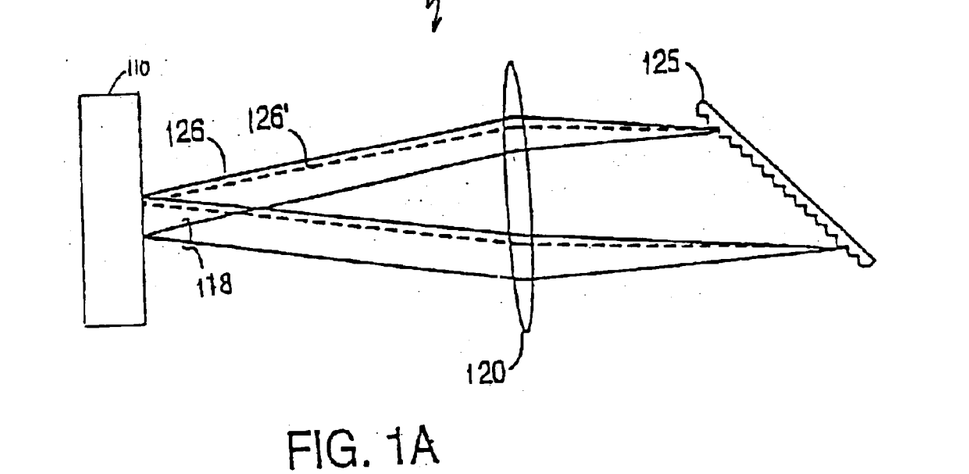
Figure 1B:
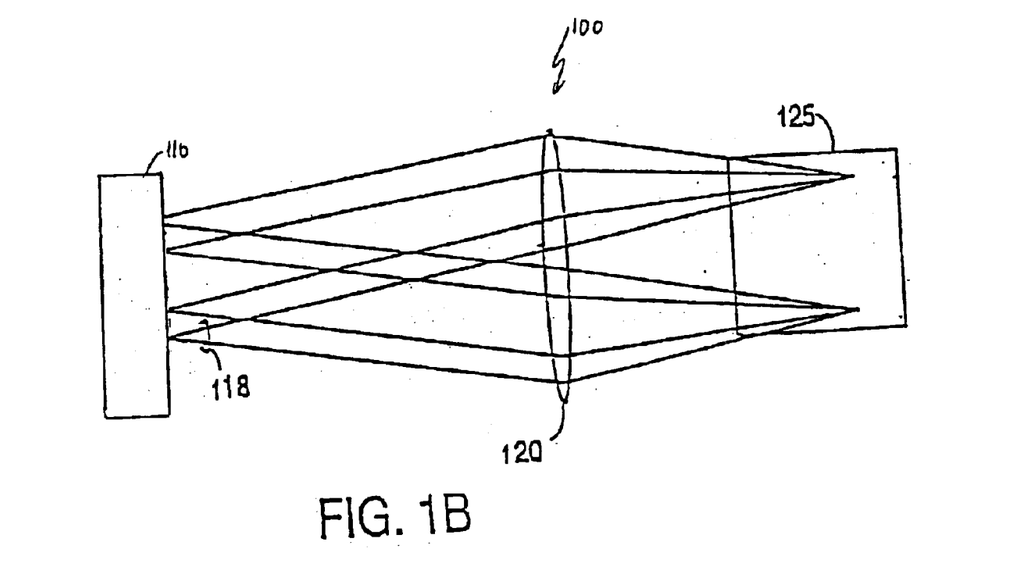

Wavelength routing functions may be performed optically with a free-space optical train and an optical routing mechanism. The free-space optical train can include air-spaced elements or can be of generally monolithic construction. One example of a wavelength router configured as a four-pass router 100 is shown in FIGS. 1A and 1B, which are respectively top and side views. Its general functionality is to accept light having a plurality N of spectral bands at an input integral with the optical routing mechanism 110 and to direct subsets of the spectral bands to desired ones of a plurality of outputs integral with the optical routing mechanism 110. The structure of the optical routing mechanism in different embodiments is discussed in detail below. Light received at the input is directed to the optical train, forming a diverging beam 118 that includes the different spectral bands. The beam 118 encounters a lens 120 that collimates the light and directs it to a reflective diffraction grating 125. The grating 125 disperses the light so that collimated beams at different wavelengths are directed at different angles back towards the lens 120.

Two such beams are shown explicitly and denoted 126 and 126', the latter drawn in dashed lines. Since these collimated beams encounter the lens 120 at different angles, they are focused towards different points in the optical routing mechanism 110. The focused beams encounter respective ones of a plurality of dynamically configurable routing elements that form part of a retroreflection assembly to direct the individual beams back, as diverging beams, to the lens 120 where they are collimated, and directed again to the grating 125. On the second encounter with the grating 125, the angular separation between the different beams is removed and they are directed back to the lens 120, which focuses them. The dynamically configurable routing elements may be configured to send their intercepted beams along a reverse path that displaces them for direction towards different outputs.

2. Optical Routing Mechanism

Figure 2A:
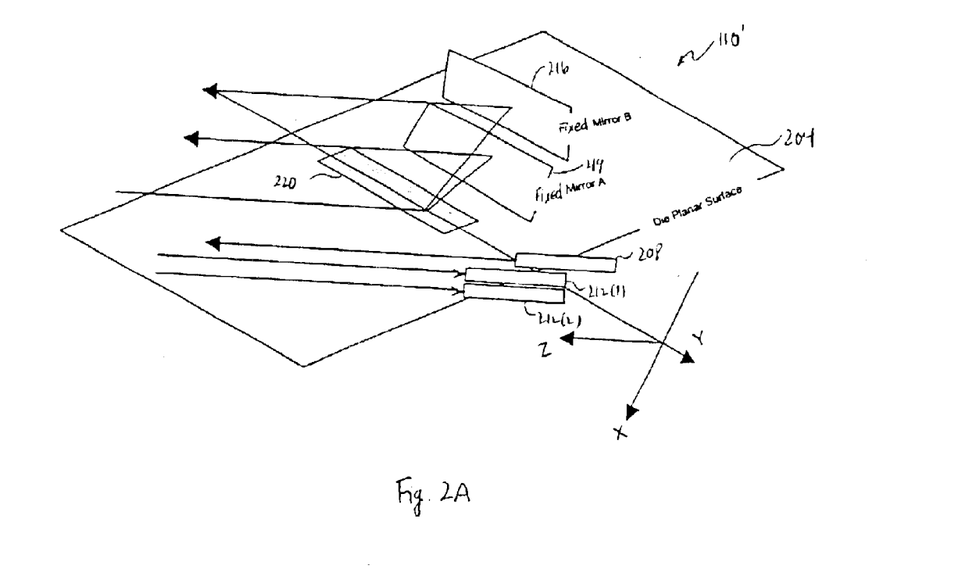
FIGS. 2A and 2B are schematic diagrams illustrating the operation of an optical routing mechanism using two fixed mirrors.

One embodiment for the optical routing mechanism is shown in FIG. 2A and denoted generally by reference numeral 110'. This figure is used to provide a schematic illustration of certain geometrical aspects of its operation. In this embodiment, retroreflection of the separated beams is achieved with a retroreflection assembly comprising two fixed mirrors 214 and 216 and a set of dynamically configurable routing elements 220. Generally, there are at least as many dynamically configurable routing elements 220 as the number of separated beams so that each of the separated beams may be routed independently. Depending on the state of each of the routing elements 220, an individual separated beam is directed either to the first fixed mirror 214 ("A") or the second fixed mirror 216 ("B"), thereby achieving a displacement that permits direction toward different outputs in the wavelength router. In FIG. 2A, an input fiber 208 and plurality of output fibers 212 are shown explicitly with arrows indicating the propagation of beams from the input fiber 208 towards the optical train and towards the output fibers 212 from the optical train.

In some embodiments, the dynamically configurable routing elements 220 comprise tiltable micromirrors made using microelectromechanical-systems ("MEMS") techniques. For example, such tiltable micromirrors may be fabricated as the MEMS devices described in the following copending, commonly assigned applications, each of which is herein incorporated by reference in its entirety for all purposes: U.S. patent application Ser. No. 09/898,988, entitled "SYSTEMS AND METHODS FOR OVERCOMING STICTION USING A LEVER," filed Jul. 3, 2001 by Bevan Staple et al.; U.S. patent application Ser. No. 09/899,000, entitled "FREE-SPACE OPTICAL WAVELENGTH ROUTER BASED ON STEPWISE CONTROLLED TILTING MIRRORS," filed Jul. 3, 2001 by Victor Buzzetta et al.; U.S. patent application Ser. No. 09/899,001, entitled "TWO-DIMENSIONAL FREE-SPACE OPTICAL WAVELENGTH ROUTER BASED ON STEPWISE CONTROLLED TILTING MIRRORS," filed Jul. 3, 2001 by Victor Buzzetta; U.S. patent application Ser. No. 09/899,002, entitled "MEMS-BASED, NONCONTACTING, FREE-SPACE OPTICAL SWITCH," filed Jul. 3, 2001 by Bevan Staple and Richard Roth; U.S. patent application Ser. No. 09/899,004, entitled "BISTABLE MICROMIRROR WITH CONTACTLESS STOPS," filed Jul. 3, 2001 by Lilac Muller; and U.S. patent application Ser. No. 09/899,014, entitled "METHODS AND APPARATUS FOR PROVIDING A MULTI-STOP MICROMIRROR," filed Jul. 3, 2001 by David Paul Anderson.

The MEMS tiltable micromirrors are formed an a MEMS die 204 that may also act as the base over which the fixed mirrors are formed. Specific examples of retroreflection assemblies that use two fixed mirrors in combination with a set of tiltable micromirrors are shown in FIGS. 4A, 4B, and 5 of commonly assigned U.S. Pat. No. 6,439,728, entitled "MULTIMIRROR STACK FOR VERTICAL INTEGRATION OF MEMS DEVICES IN TWO-POSITION RETROREFLECTORS," filed Aug. 28, 2001 by Frederick Kent Copeland ("the '728 patent"), the entire disclosure of which is herein incorporated by reference for all purposes.

FIG. 2A also notes an (x, y, z) Cartesian coordinate system used in defining orientations used in the discussion below. The z axis corresponds to the optical axis of the optical train. The xy plane is orthogonal to that optical axis, with the y axis being defined to correspond to a symmetry axis along which the dynamically configurable routing elements 220 are spaced. The x direction is constrained by the requirement of a right-handed Cartesian system. Thus, for example, the top view of FIG. 1A corresponds to a view parallel to the yz plane and the side view of FIG. 1B corresponds to a view parallel to the xz plane. An end view in the xy plane would correspond to a view along the optical axis of the optical train.

In considering the operation of a wavelength router, there were a number of design factors that confronted the inventor, with certain parameters being desirable either to mitigate optical aberrations or to facilitate manufacturing. For example, in FIG. 2A, it is evident that the end of the input fiber 208 is at a different z value than the end of the ends of the output fibers 212 to accommodate path-length differences in the system. This configuration is an example of a set of configurations discussed in greater detail in copending, commonly assigned U.S. patent application Ser. No. 09/747,064 entitled "WAVELENGTH ROUTER WITH STAGGERED INPUT-OUTPUT FIBERS," filed Dec. 20, 2000 by Robert Anderson and Samuel P. Weaver, the entire disclosure of which is herein incorporated by reference in its entirety for all purposes. In addition, the geometry of the arrangement resulting from the positions of the fixed mirrors 216 causes the ends of the fibers to be offset in the x direction. This offset results in an aberration from conical diffraction imposed by encounters with the diffraction grating 125 during propagation through the optical train. In particular, because of the dispersion in x, the recollapse of the separated beams by the diffraction grating 125 causes a corresponding shift in they direction also. To mitigate this effect, the arrangement shown in FIG. 2A may be realized by positioning the input and output fibers with separate fiber blocks positioned to split the difference in alignment.

Figure 2B:
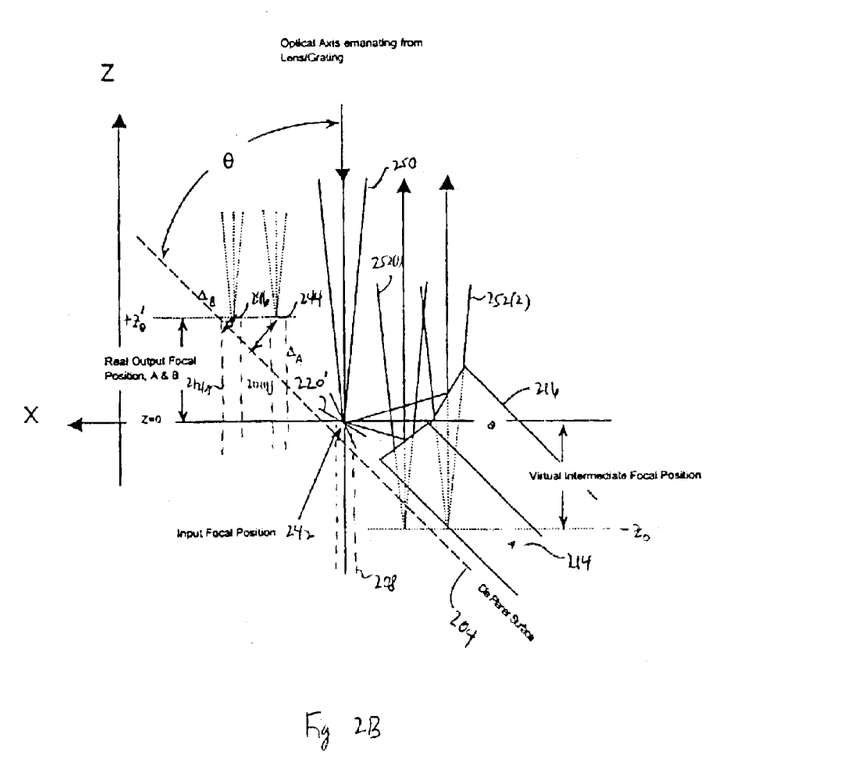

It is, however, desirable to have a single fiber block that may be used to position all of the input and output fibers. Use of a common fiber block permits manufacturing efficiencies since polishing and coating of the fibers may be performed simultaneously with a common position. A further impediment to using a single fiber block may be understood with respect to parfocalization requirements. This is illustrated in FIG. 2B, which shows the path of specific optical beams in a cross section of the optical routing mechanism 110' parallel to the xz plane. The coordinate system is chosen so that the focal position 242 of the beam emanating from the input fiber 208 is at x=z=0. As noted in the figure, the surface of the MEMS die 204 is inclined with respect to the x and z axes, with the angle of inclination θ being defined with respect to the z axis.

As illustrated, when one of the separated beams 250 is retroreflected, it encounters the corresponding dynamically configurable routing element 220', shown schematically as a tiltable micromirror and is directed to one of the fixed mirrors 214 or 216. The retroreflected beams 252 are parfocalized with respect to the xy plane, in the specific sense that they are all share a virtual intermediate focal position on a common plane parallel to the xy plane, shown in FIG. 2B to be located at $-z_0$. While the illustration shows the possible retroreflections for a particular one of the dynamically configurable routing elements 220', similar possible retroreflections are available for each of dynamically configurable routing elements displaced along the y axis perpendicular to the page. The configuration of the set of dynamically configurable routing elements 220' determines which spectral bands are reflected from fixed mirror "A" 214 and which are reflected from fixed mirror "B."

After recollapsing the separate beams with the diffraction grating 125, beams are directed to the output fibers 212 with virtual focal positions at point 244 (corresponding to those spectral bands reflected from fixed mirror "A") and at point 246 (corresponding to those spectral bands reflected from fixed mirror "B"). While these beams are parfocalized with respect to the xy plane, both being focused at $+z'_0$, they are not parfocalized with respect to the surface of the MEMS die 204, being respectively positioned at distances $\Delta_A$ and $\Delta_B$ from that surface. Parfocalization of the beams with respect to the xy plane would be desirable since it would facilitate manufacturing the optical routing mechanism with a single fiber block than does parfocalization only with respect to the surface of the MEMS die 204.

Figure 3A:
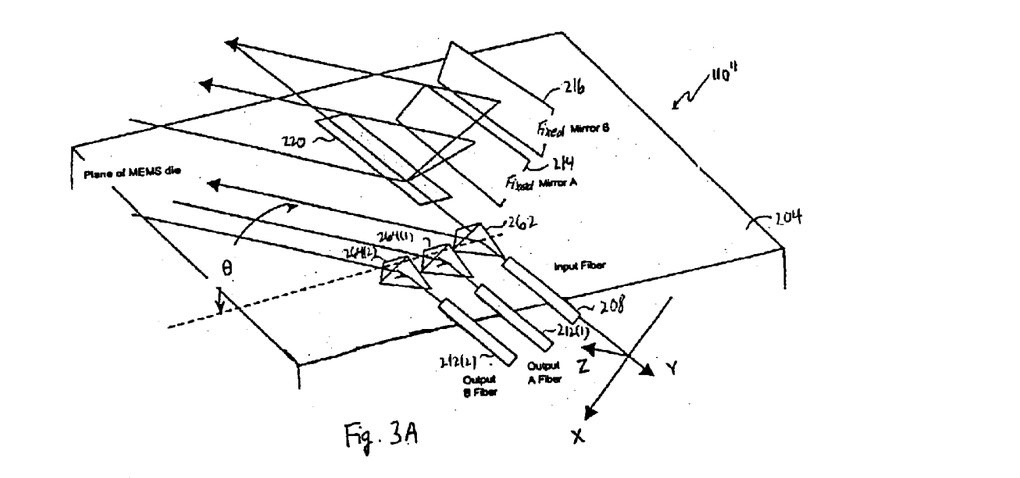
FIGS. 3A and 3B are schematic diagrams illustrating the operation of an optical routing mechanism using two fixed mirrors and having fold mirrors.
Figure 3B:
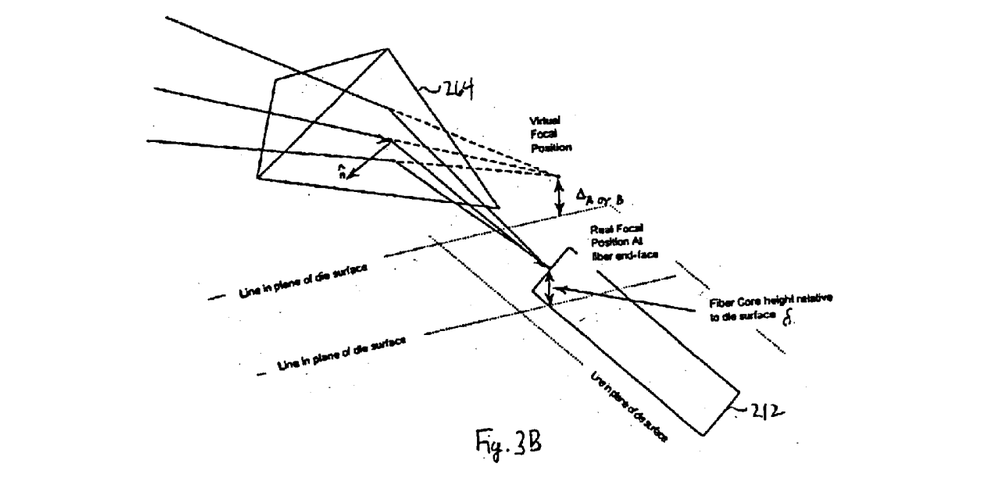

FIGS. 3A and 3B are used to illustrate an embodiment for an optical routing mechanism 110' similar to that of FIG. 2A, but with the additional feature that the input and output fibers 208 and 212 lie in a common plane parallel to the surface of the MEMS die 204. To accommodate this additional constraint, folding elements 262 and 264 are provided to redirect the input and output beams respectively along the optical axis z of the optical train. The folding elements 262 and 264 may comprise a surface mirror, a prism, or similar optical element that acts to steer the beam between the respective fibers and paths parallel to the optical axis of the optical train.

The general configuration of an embodiment of such an optical routing mechanism 110∝ is shown in FIG. 3A, with FIG. 3B illustrating in detail the geometric relationship of the folding element to the fiber. While FIG. 3B shows on output fiber 212 and a corresponding folding element 264, the principles illustrated apply equally to the input fiber 208 and associated folding element 262. The orientation of each folding element 264, which may be defined by the orientation of a surface normal ñ in embodiments where the folding element 264 comprises a folding mirror, is dependent both on the orientation of the corresponding fiber 212 and on the orientation θ of the optical axis with respect to the surface of the MEMS die 204. For a fiber 212 positioned with a core having a height δ above the MEMS die surface 204, the corresponding folding element 264 is oriented so that the beam as directed along the optical axis z has a virtual focal position a distance Δ above the die surface 204. In certain embodiments, this distance A corresponds to the distance $\Delta_A$ or $\Delta_B$ discussed with respect to FIG. 2B so that the combination of configuring the optical fibers in a plane parallel to the die surface 204 and including folding elements 264 effectively reproduces the optical geometry of FIG. 2B. The input fiber 208 may similarly be positioned a distance $\delta_I$ above the die surface 204 so that the beam propagated towards the optical train has a virtual focal position a distance $\Delta_f$ above the die surface 204.

While the illustration in FIG. 3A shows an optical routing mechanism integrally mated with one input fiber and two output fibers, it will be evident to those of skill in the art that the principles may be applied to an arbitrary number of input and output fibers. Such larger numbers of fibers will generally also be accommodated by including additional fixed mirrors in the retroreflection assembly.

For an arbitrary orientation θ of the optical axis z with respect to the die surface 204, each fiber port is provided with a separate fold element and fiber support height relative to the die surface 204. The inventor has further recognized that in the instance where θ is substantially equal to 90°, it is possible to use a common folding element for all of the fibers, both input and output fibers. Moreover, he has further recognized that additional advantageous features may be implemented where the retroreflection assembly adds an additional fixed mirror, such as shown in FIGS. 6A and 6B of the '728 patent. Unexpectedly, the additional degree of freedom provided by the additional fixed mirror permits configurations, discovered by the inventor, that provide parfocalization of beams with respect to the surface of the MEMS die and that simultaneously reduce the effect of conical distortion. A variety of other advantages that derive from the configurations discovered by the inventor will be further evident from the following discussion.

3. Conic-Section Envelope

Certain embodiments of the invention advantageously use an envelope of a conic section to define arrangements of optical elements. The conic-section principles that are exploited are illustrated schematically in FIGS. 4A–4C for three different conic sections. The conic envelope describes a surface whole normal vector at any point along the surface can be attributed to the pointing direction of flat fixed-mirror facets. In instances where the surface of a fixed mirror is planar, it does not add power or cylinder to the beam path.

Figure 4A:
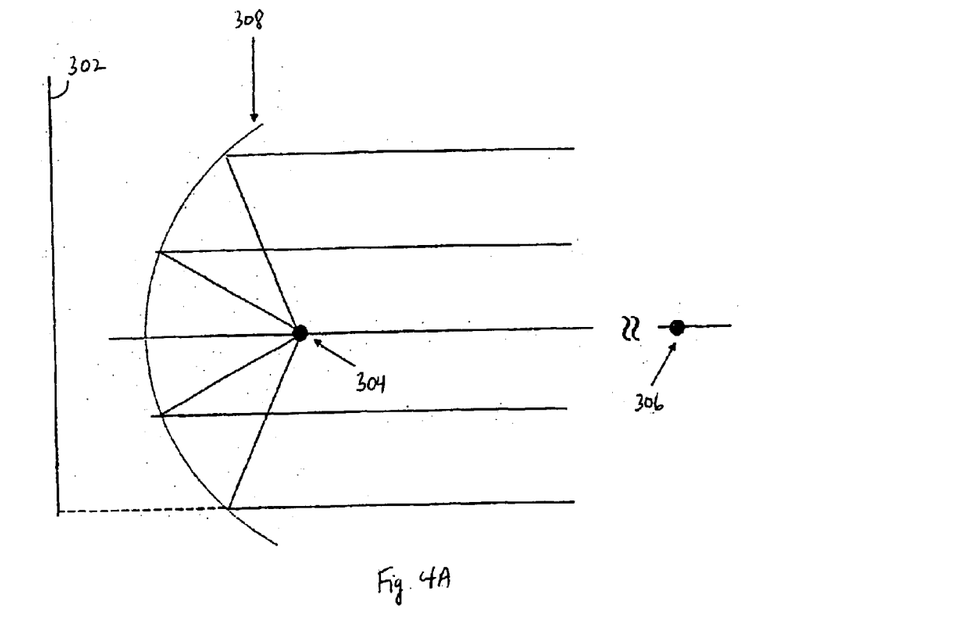
FIGS. 4A–4C are schematic diagrams illustrating the use of a conic-section envelope in configuring elements of an optical routing mechanism in accordance with an embodiment.

Thus, in FIG. 4A, the use of a parabolic conic section is illustrated. The directrix or focal surface is denoted 302 and the parabolic surface envelope is denoted 308. The parabolic surface envelope has a focus 304 that corresponds to a switching point for the optical arrangement. For a parabolic conic section, the exit pupil vertex is located at infinity, making the arrangement especially suitable for telecentric configurations.

Figure 4B:
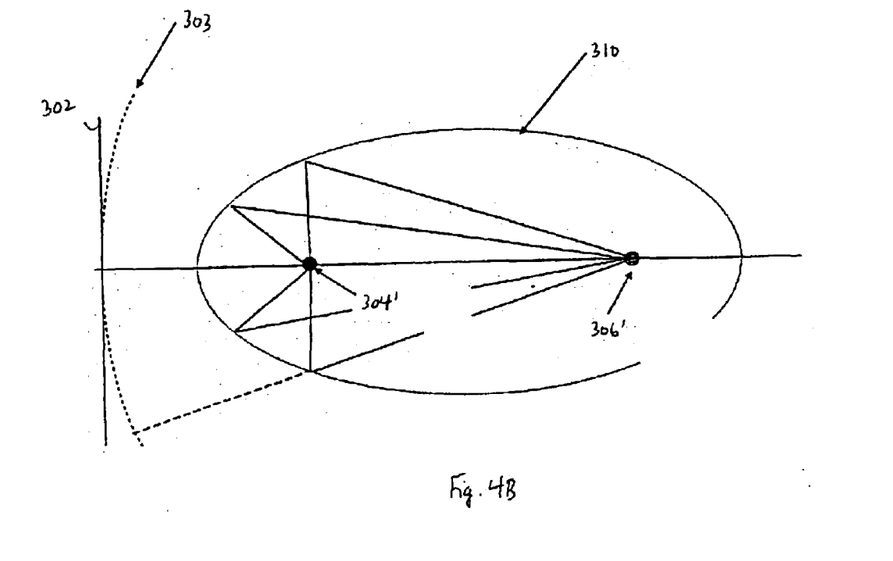

In FIG. 4B, the use of an elliptical conic section is shown. In this instance, the switching point 304' is located at one of the foci of the elliptical surface envelope 310 and the exit pupil vertex 306' is located at the other vertex. In this instance, the arrangement is nontelecentric so that the directrix or common-path-length focal surface 303 is curved with respect to flat surface 302. The nontelecentricity of the optical arrangement makes is especially suitable for port multiplexor arrangement.

Figure 4C:
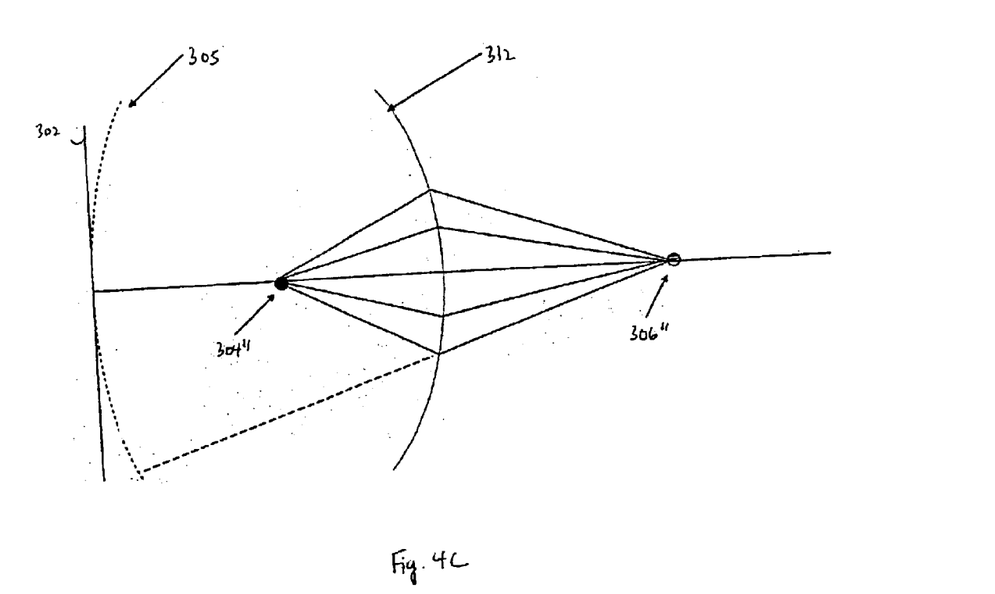

In FIG. 4C, the use of a hyperbolic conic section is shown. In this instance, the switching point 304" is located at a focus of the hyperbolic surface envelope 312 and the exit pupil vertex 306" is positioned a finite distance from the switching point 304". As for the elliptical surface envelope 310 shown in FIG. 3B, the directrix or common-path-length focal surface is curved with respect to flat surface 302.

There are a variety of considerations that may be affect the choice of conic-section envelope to be used in a given application. A principal consideration is whether the optical arrangement is to use a telecentric arrangement or to have a finite exit-pupil distance. The factors that bear on such a choice are well known to those of skill in the art. For example, the optical arrangement for the wavelength router described in connection with FIGS. 1A–1B suggests the use of a telecentric arrangement. Such a choice reflects the fact that telecentric chief rays in spectral switching space permit spectral retrace and a collapsed spectrum at four-pass output-image points. The specific geometric parameters of the conic-section envelope may be determined according to physical constraints on the geometrical arrangement. For example, in an arrangement such as provided by the wavelength router of FIGS. 1A–1B, chief-ray spatial separations may be based on fiber-to-fiber spacing and the selected conic section. Such fiber-to-fiber spacings may be affected by such factors as the thickness of the cladding layer on each fiber, for example. The chief-ray angular separation may be based on port-isolation and related requirements. The focal lengths of the conic section, and even the number of conic sections that may be used, may be based on the physical dimensions of the optical fibers and the relative focal points.

Accordingly, the use of a conic-section envelope permits a determination for each application of an optimized arrangement for the optical elements. This is illustrated below for an arrangement that may be used in the wavelength router described in connection with FIGS. 1A–1B. This embodiment uses both the common folding element and the third fixed mirror ("C") discussed above and shown in FIGS. 6A and 6B of the '728 patent. The optical arrangement is shown in perspective view in FIG. 5, with the optical routing mechanism denoted generally by reference numeral 110'". Notably, because θ is substantially equal to 90°, the xy plane is substantially parallel to (or coincident with) the die surface plane 204. Light from the input fiber 208 is thus directed to encounter the common folding element 266, shown in the illustrated embodiment to comprise a common folding mirror, which redirects the beam parallel to the z axis towards the optical train. With θ substantially equal to 90°, this beam propagates substantially orthogonally to the die surface plane 204. The optical train disperses the beam along they axis and directs the separated beams towards the retroreflection assembly along a path that is also substantially orthogonal to the die surface plane 204. Because of this orthogonality, as discussed in the '728 patent, a window for hermetically sealing the retroreflection assembly may be included substantially parallel to the die surface plane 204, thereby limiting aberrations that would otherwise result from an inclined sealing window.

Figure 5:
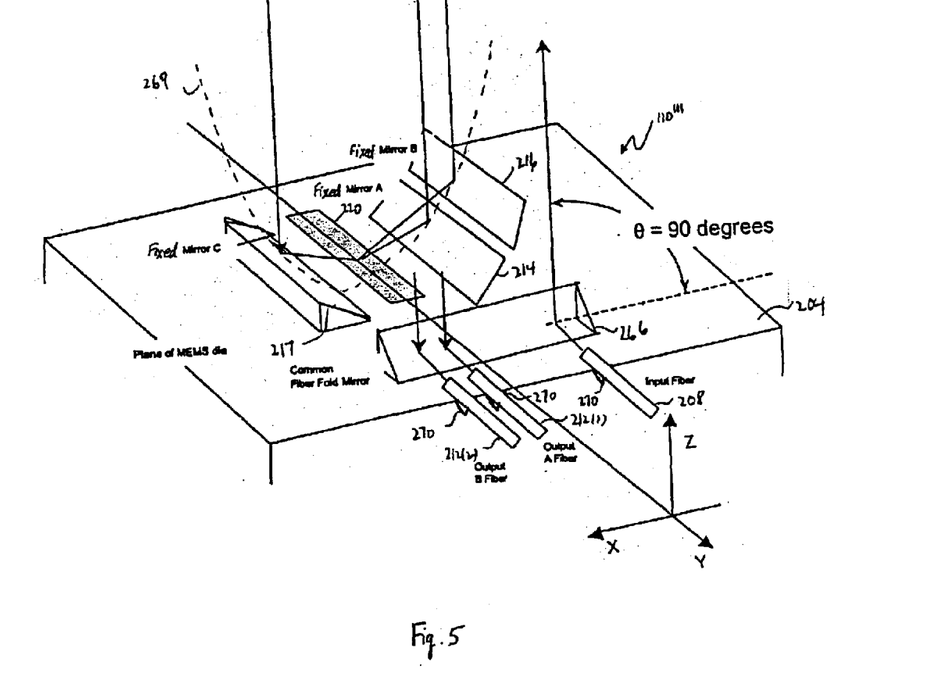
FIG. 5 is a schematic diagram illustrating an embodiment of an optical routing mechanism using three fixed mirrors.

Each of the separated beams encounters fixed mirror "C" 217, which directs the beams to the respective dynamically configurable routing elements 220. Depending on the configuration of the dynamically configurable routing elements 220, the individual separated beams are then directed either towards either fixed mirror "A" 214 or fixed mirror "B" 216. The three fixed mirrors 214, 216, and 217 are disposed within the arrangement so that they are encountered by the respective rays at points that fall along conic-section envelope 269, which is shown in the arrangement as a parabolic-section envelope in accordance with the telecentricity of the arrangement. The fact that there is a difference in x displacement for beams directed towards fixed mirror "A" 214 or fixed mirror "B" 216 is maintained when the y dispersion is removed by further propagation through the optical train. Accordingly, spectral bands comprised by those beams directed towards fixed mirror "A" 214 are included in the beam directed to the first output fiber 212(1) and spectral bands comprised by those beams directed towards fixed mirror "B" 216 are included in the beam directed to the second output fiber 212(2). Since those beams are propagated along the optical axis z of the optical train, the common folding element 266 is used to redirect them towards the output optical fibers 212. Because the illustrated embodiment uses output optical fibers 212 disposed in the xy plane, the folding element 266 is shown as a folding mirror having an inclination of 45° with respect to the die surface 204.

In the embodiment illustrated in FIG. 5, the optical fibers 208 and 212 are shown supported in V-shaped grooves 270 formed directly in the MEMS die surface 204. Various alternative support arrangements may be used. For example, a separate V-block may be configured to support the optical fibers at the desired x and z positions and positioned directly on the MEMS die surface 204. In another embodiment, both the MEMS die and the V-block may be positioned on a microbench, with the thickness of the MEMS die and the arrangement of the V-block configured to achieve the desired x and z positions for the optical fibers.

While the illustration in FIG. 5 shows an optical routing mechanism integrally mated with one input fiber and two output fibers, it will be evident to those of skill in the art that the same principles may be applied to an arbitrary number of input and output fibers. Some such embodiments may accommodate using a greater number of fibers with a greater number of fixed mirrors in the retroreflection assembly, while still using only a single common folding element 266.

One feature of the optical routing mechanisms described above is that they permit a common mating datum to be used both for the input and output optical fibers 208 and 212 and for the retroreflection assembly. This, in turn, permits a number of manufacturing simplifications for a wavelength router that uses such an integrated optical routing mechanism. Below, further advantages made possible by an optical routing mechanism made in accordance with embodiments of the invention are discussed. In particular, geometric arrangements that address conical-diffraction and parfocalization issues are discussed with reference to FIGS. 6A–6C.

Figure 6A:
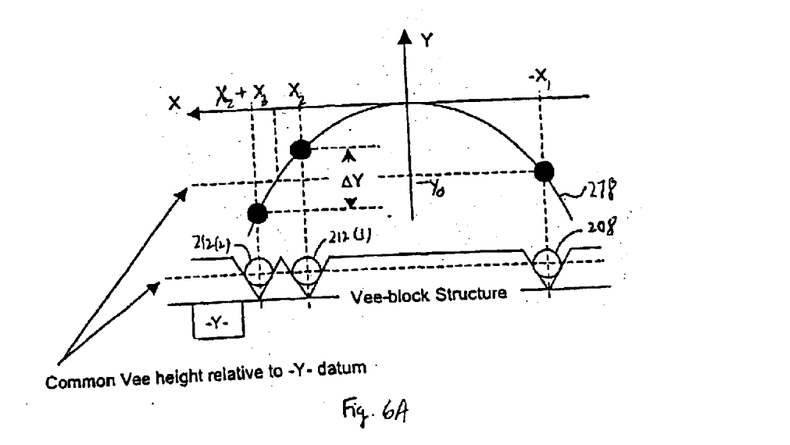
FIGS. 6A–6C are illustrations of geometrical considerations used in configuring an optical routing mechanism in accordance with an embodiment of the invention.

FIG. 6A presents a schematic illustration, shown parallel to the xy plane, of one embodiment for positioning the input and output optical fibers integrally with the optical routing mechanism. With respect to the origin of the (x, y, z) coordinate system, the x position of the input optical fiber 208 is denoted $-x_1$ and the x position of the first output optical fiber 212(1) is denoted $+x_2$, with the separation between the second and first output optical fibers 212(2) and 212(1) being denoted by $x_3$. The effect of conical diffraction produced by the recollapsing of optical beams displaced in x through the optical train is shown by curve 278 in FIG. 6A. Specifically, the displacement of a beam in x by the retroreflection assembly causes a corresponding shift in y as defined by curve 278 after the displaced beam is propagated back through the optical train.

For example, consider a beam propagated through a wavelength router from an input fiber having an end at (x, y)=$(-x_1, -y_0)$. If the retroreflection arrangement produced no displacement in x, the beam would return to (x, y)=$(-x_1, -y_0)$ after propagation back through the optical train. In order to effect the desired routing functions, however, separated beams are displaced by different amounts by the retroreflection assembly so that after propagation back through the optical train, beams are focused at different points on curve 278. In the illustration, the desired separation among the plurality of output fibers of $x_3$ produces a resultant separation in y of $\Delta y$. To minimize the effect of conical diffraction, the total dispersion of focal points in y among both the input beam and output beams is minimized. This is achieved in one embodiment with the constraint $$x_1 = x_2 + \tfrac{1}{2} x_3,$$

ensuring that the y position for the focus of the input beam is intermediate and approximately equidistant from the y positions for the foci of the output beams. Moreover, when this constraint is satisfied, there are many applications in which the maximum deviation in focus between the input beam and one of the output beams, i.e. $\Delta y/2$, is less than a budget for acceptable misalignment with a wavelength-router assembly. In such applications, the fibers may be configured to have their ends at a common y position, further simplifying manufacturing of the integrated optical routing mechanism. In one such embodiment, the common y position is substantially coincident with the focus of the input beam. It is noted that in an embodiment using more than two output optical fibers 212, the same constraint may be applied where $x_2$ is the position of the first output fiber and $x_3$ is its separation from the last output fiber, with all the other output fibers being positioned intermediate between them; it is not necessary for all the output fibers be equally separated from each other to satisfy the constraint.

Figure 6B:
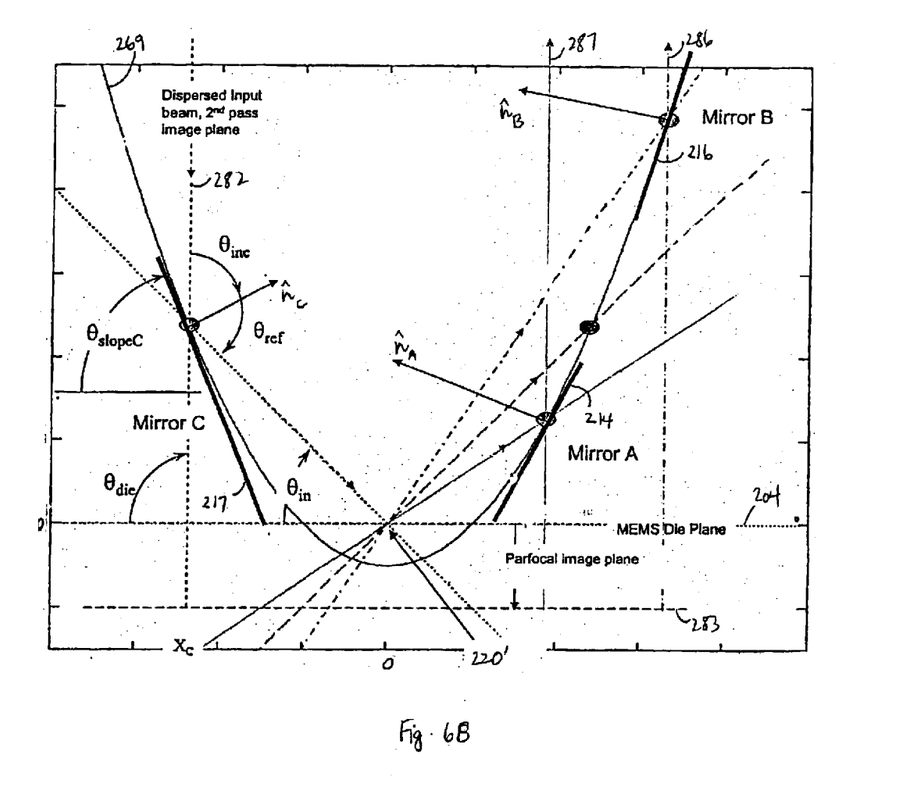
Figure 6C:
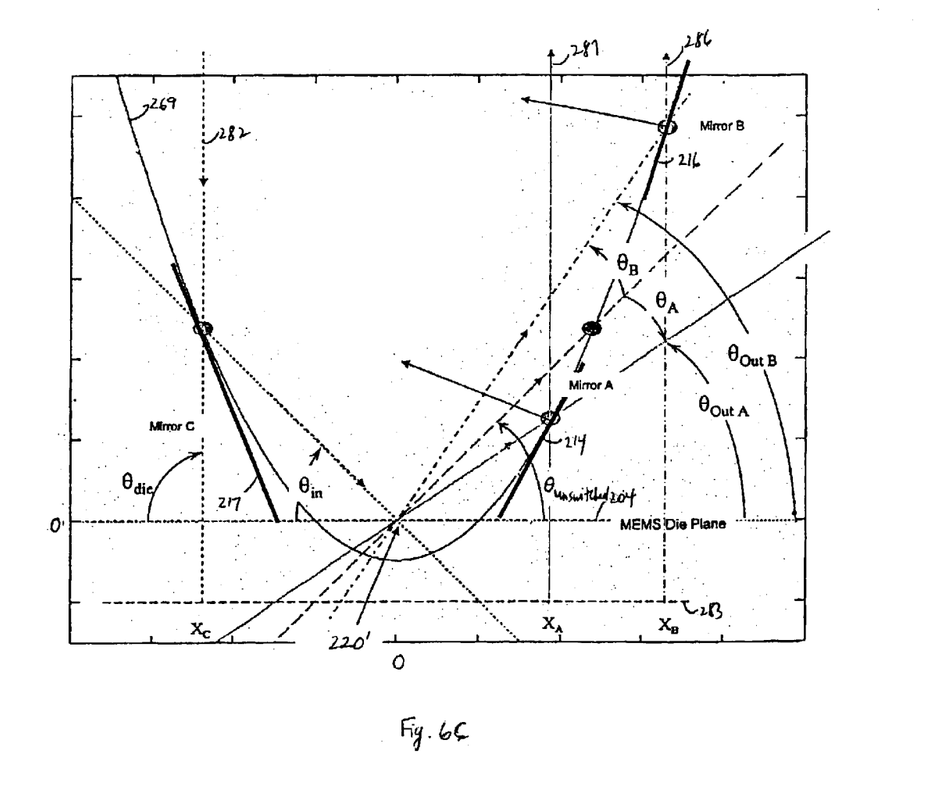

Parfocalization of the input and output beams with respect to the MEMS die surface 204 is illustrated in FIGS. 6B and 6C with cross-sectional views of the xz plane. The figures show schematically the retroreflector arrangement for a particular separated beam, with the normals for fixed mirrors "A" 214, "B" 216, and "C" 217 denoted respectively by $\hat{n}_A$, $\hat{n}_B$, and $\hat{n}_C$. The beam 282 is incident from the optical train onto fixed mirror "C" 217 and is reflected towards and focused onto the dynamically configurable routing element 220' corresponding to that separated beam. The parfocal image plane 283 is shown in shadow line below the MEMS die surface 204. For a parabolic-section envelope 269, the parfocal image plane 283 is located at twice the parabola focal length, with the parabolic focus placed at the MEMS switching point. The beam 286 reflected from fixed mirror "B" 216 is denoted by reference numeral 286 and the counterpart beam reflected from fixed mirror "A" 214 is denoted with reference numeral 287. As previously noted, both the incident and reflected beams 282, 286, and 287 propagate substantially normal to the MEMS die surface 204 so that a hermetic window 280 may be included substantially parallel to the MEMS die surface 204 as shown.

The parfocalization condition may be imposed by requiring that the virtual focus of each of the beams associated with fixed mirrors "A," "B," and "C" be coplanar at the same distance from the MEMS die surface 204. Thus, the input angle may be determined according to the geometry set forth in FIG. 6B. In that figure, angle $\theta_{die}$ corresponds to the input-beam-path chief-ray direction relative to the MEMS die-surface normal. The angle $\theta_{in}$ corresponds to the angle of the input ray relative to the MEMS die plane 204. The value of θin may be selected based upon angular switching states of the device and packaging considerations. The angle $\theta_{slopeC}$ defines the slope of the conic section, representing the pointing direction of fixed mirror C 217, and is referenced to the MEMS die plane 204. The angles θinc and θref respectively correspond to the angles of incidence and reflection on fixed mirror C 217 and meet the constraint that $\theta_{inc} = \theta_{ref}$. Based on the supplementarity of angles within a triangle, $$\theta_{die} + \theta_{in} = \theta_{inc} + \theta_{ref}.$$

The slope of fixed mirror C bisects the apex angle of these triangles so that $$\theta_{slopeC} = 90° - [180° - (\theta_{die} + \theta_{in})]/2.$$

Thus, for example, if the input angle is $\theta_{in} = 45°$, then the slope of fixed mirror C 217 is $\theta_{slopeC} = 67.5°$. Similarly, if the input angle is $\theta_{in}=25°$, then the slope of fixed mirror C 217 is $\theta_{slopeC}=57.5°$.

The conic-section envelope 269 may be used to determine the x coordinate of the input ray path, and therefore the position of fixed mirror C 217. The general conic section equation is $$z_k(x, r) \equiv \frac{x_C^2/r}{1 + \sqrt{1 - (k+1)\frac{x_C^2}{r^2}}},$$

where k defines the type of conic section and r is the radius of curvature of the conic parent section. For a parabola, k=−1 so that the equation is simplified to $$z \equiv \frac{x_C^2}{2r}.$$

The slope of the parabola is expressed by the derivative about the point $x_C$, $$\frac{dz}{dx} = x_C/r.$$

Thus, for a given radius of the parabolic envelope function, or equivalently a given focal length of the parabola, the x coordinate of the input-ray path is $$x_C = r \tan \theta_{slopeC}.$$

A similar analysis may be performed for fixed mirrors A and B 214 and 216 to determine the positions of the output fibers 212 using the geometry shown in FIG. 6C. In FIG. 6C, $\theta_{die}$ again corresponds to the input-beam-path chief-ray direction relative to the MEMS die-surface normal. The angle $\theta_{unswitched}$ corresponds to the angle of the input ray after reflection from the routing element 220 and is measured relative to the MEMS die plane 204. For planar mirrors, $\theta_{unswitched}=\theta_{in}$. This value may be selected based upon angular-switching-state and packaging considerations, such as how many states may exist above the plane of the MEMS die 204. The angles of the rays after reflection from the routing element 220 are denoted $\theta_A$ and $\theta_B$ respectively for the rays that encounter fixed mirror A 214 and fixed mirror B 216, with $\theta_A$ and $\theta_B$ being defined relative to $\theta_{unswitched}$. In one embodiment, the dynamically configurable routing elements have a 2× magnifier over a mechanical switch angle, so that for a symmetric switch design, $\theta_A = -\theta_B \equiv 2\alpha$. The angles for the rays that respectively encounter fixed mirrors A and B 214 and 216 are therefore $$\theta_{OutA} = \theta_{unswitched} - \theta_A$$

$$\theta_{OutB} = \theta_{unswitched} + \theta_B.$$

From similar geometry used to determine $\theta_{slopeC}$, the following results are evident:

$$\theta_{slopeA} = 90° - [180° (\theta_{die} + \theta_{outA})]/2$$

$$\theta_{slopeB} = 90° - [180° (\theta_{die} + \theta_{outB})]/2.$$

Thus, for example, if $\theta_{in}=45°$, $\theta_{die}=90°$, and $\alpha=5.5°$, then $\theta_{OutA}=34°$, $\theta_{OutB}=56°$, $\theta_{slopeA}=62°$, and $\theta_{slopeB}=73°$.

The general conic section equation provided above may be used in the same fashion as used to determine the x locations of the input port to determine the x locations of the output ports. Thus, applying the same technique, $$x_A = r \tan \theta_{slopeA}$$

$$x_B = r \tan \theta_{slopeB}.$$

The specific illustration of calculating positions above has been provided according to an example where the conic-section envelope comprises a parabolic-section envelope. Such an envelope is suitable, for example, for telecentric applications. It will be evident to those of skill in the art that the same calculations may similarly be performed using other conic-section envelopes, such as an elliptical-section envelope, which is suitable, for example, for applications having a finite exit pupil.

Having described several embodiments, it will be recognized by those of skill in the art that various modifications, alternative constructions, and equivalents may be used without departing from the spirit of the invention. For example, while the invention has been illustrated with a particular form of wavelength router, it is possible for aspects of the invention to be adapted to a variety of wavelength-router designs. Accordingly, the above description should not be taken as limiting the scope of the invention, which is defined in the following claims.

What is claimed is:

1. A wavelength router for receiving, from an input fiber, light having a plurality of spectral bands and directing subsets of the spectral bands to respective ones of a plurality of output fibers, the wavelength router comprising:

a free-space optical train disposed to provide optical paths for routing the spectral bands between the input fiber and the output fibers; and an optical routing mechanism integrally mated by a common surface with end portions of the input and output fibers, the optical routing mechanism having a plurality of dynamically configurable routing elements, each such routing element being configured to direct a given spectral band to different output fibers depending on a state of such routing element.

2. The wavelength router recited in claim 1 further comprising a plurality of fiber folding elements disposed over the common surface, each such fiber folding element oriented to direct light between a respective one of the fibers and a path parallel to an optical axis of the free-space optical train.

3. The wavelength router recited in claim 2 wherein:

the dynamically configurable routing elements comprise tiltable micromirrors formed over the common surface; and the optical routing mechanism further has a plurality of fixed mirrors, each such fixed mirror disposed to encounter the given spectral band depending on the state of such routing element.

4. The wavelength router recited in claim 1 wherein ends of the input and output fibers are disposed in a common plane orthogonal to an optical axis of the free-space optical train.

5. The wavelength router recited in claim 4 further comprising a common fiber folding element disposed over the common surface and oriented to direct light between each of the fibers and paths parallel to an optical axis of the free-space optical train.

6. The wavelength router recited in claim 5 wherein:

the dynamically configurable routing elements comprise tiltable micromirrors formed over the common surface; and the optical routing mechanism further has a first fixed mirror disposed to encounter each spectral band and a plurality of second fixed mirrors, each such second fixed mirror disposed to encounter the given spectral band depending on the state of such routing element.

7. The wavelength router recited in claim 6 wherein the first fixed mirror and the plurality of second fixed mirrors are disposed to encounter the given spectral band at points substantially lying along a conic-surface envelope.

8. The wavelength router recited in claim 7 wherein the conic-surface envelope comprises a parabolic-surface envelope.

9. The wavelength router recited in claim 7 wherein the conic-surface envelope comprises an elliptical-surface envelope.

10. The wavelength router recited in claim 4 wherein ends of the fibers are disposed substantially according to the relationship $x_1 \simeq x_2 + \frac{1}{2}x_3$, where each $x_i$ measures a distance along an axis parallel to the common plane and orthogonal to a symmetry axis along which the dynamically configurable routing elements are disposed, $x_1$ representing a distance between the symmetry axis and the input fiber, $x_2$ representing a distance between the symmetry axis and a nearest of the output fibers to the symmetry axis, and $X_3$ representing a distance between the nearest output fiber and a farthest of the output fibers from the symmetry axis.

11. The wavelength router recited in claim 5 further comprising a window disposed substantially orthogonally to the optical axis and adapted for hermetically sealing the optical routing mechanism.

12. The wavelength router recited in claim 4 wherein the common plane is substantially parallel to the common surface.

* * * * *